United States Patent

Kruczek

[15] 3,644,848

[45] Feb. 22, 1972

[54] FREQUENCY SELECTING MODULAR COMPONENT AND ASSEMBLY FORMED THEREFROM

[72] Inventor: Chester R. Kruczek, Riverdale, N.J.

[73] Assignee: General Instrument Corporation, Newark, N.J.

[22] Filed: Aug. 26, 1969

[21] Appl. No.: 853,132

[52] U.S. Cl. ..........................333/70 S, 317/101 C, 325/355, 333/77

[51] Int. Cl. ..........................H03h 7/10

[58] Field of Search ................317/101 CB, 101, 100, 100 B, 317/101 C, 101 CC, 101 CM, 101 CP, 101 B; 333/70, 70 S, 77, 78; 325/355, 356; 334/85; 336/90; 330/66; 331/67, 68

[56] References Cited

UNITED STATES PATENTS

| | | | |
|---|---|---|---|
| 2,026,661 | 1/1936 | Trevor | 325/355 |
| 2,726,334 | 12/1955 | Chelgren et al. | 334/85 X |
| 2,912,656 | 11/1959 | Waring | 333/77 |
| 3,021,493 | 2/1962 | Farquhar | 333/70 S X |
| 3,467,892 | 9/1969 | Sprude et al. | 317/100 X |
| 3,475,657 | 10/1969 | Knowles | 317/100 X |
| 2,738,466 | 3/1956 | Niederman | 333/70 S |
| 3,324,224 | 6/1967 | Thibodeau | 317/101 CM X |

*Primary Examiner*—Herman Karl Saalbach
*Assistant Examiner*—Paul L. Gensler
*Attorney*—James and Franklin

[57] ABSTRACT

A frequency-selecting assembly is formed from a plurality of substantially similar tunable modular components mounted on an insulating support plate having an input and an output terminal. Each component comprises an L.C. resonant circuit and a plurality of terminals extending therefrom. Means are provided on the support plate to electrically connect selected terminals of a first module to the assembly input terminal and to a selected terminal on a second module, to connect selected terminals on succeeding modules to one another, and to connect a selected terminal of the last module to the assembly output terminal. The assembly input and output terminals extend from the support plate in a direction different from that of the tunable modules.

20 Claims, 15 Drawing Figures

INVENTOR
CHESTER R. KRUCZEK
BY James and Franklin
ATTORNEY

INVENTOR
CHESTER R. KRUCZEK
BY James and Franklin
ATTORNEY

INVENTOR
CHESTER R. KRUCZEK
BY James and Franklin
ATTORNEY

FREQUENCY SELECTING MODULAR COMPONENT AND ASSEMBLY FORMED THEREFROM

The present invention relates generally to frequency-selecting circuitry, and particularly to a frequency-selecting assembly formed from a plurality of substantially similar tunable modules.

One of the major components of a communications receiver is a frequency-selecting stage, which is usually operatively connected between the receiver front end and the detection and amplifying stages of the receiver. That selecting stage is commonly in the form of a band-pass filter which passes a band of frequencies centered about a given resonant frequency, typically the intermediate frequency (IF) of the receiver. The use of filters of this general type is described in some detail at pages 37–57 of the Apr. 1969 issue of "Electronics World" (Volume 81, No. 4) (See particularly pages 53–55). The pass band should be sufficiently wide to pass the important sideband frequencies carried on the intermediate frequency signal, but should be sufficiently narrow to pass only the desired frequencies and reject other frequencies not associated with the desired IF signal, thereby to prevent undesired cross-modulation. For optimum performance of a band-pass filter of this type the frequency characteristic should have a flat top centered at the intermediate frequency and falling off sharply at both ends at the rejected frequencies.

Frequency band-pass filters are usually formed of a number of resonant circuits, which are preferably, though not necessarily, tuned to the same center frequency (i.e., the intermediate frequency). These circuits are coupled (e.g., inductively) to one another with critical coupling to achieve the optimum flattop frequency characteristic. There may be any number of such coupled resonant circuits successively coupled to one another to produce a desired frequency band-pass characteristic for a particular receiver application.

With the decreased size of almost all electrical and electronic components now available, the prevailing trend is to package electronic apparatus in as small a space as is practical. This has led to the widespread utilization of assemblies of circuit modules to form packaged circuits which may include a great many electrical components. The various module assemblies are interconnected by suitable connectors to form an overall electrical apparatus.

Frequency selecting circuits, such as the band-pass circuit described above, have heretofore generally not been amenable to modularization techniques. This is particularly true for circuits of this type which include a plurality of coupled tuned circuits. The use of three or more of these tuned circuits connected in cascade is often required for optimum receiver performance, in order to produce a frequency band-pass characteristic having a significantly steeper curve and thus provide for greater receiver selectivity. In a multiunit tuning stage of this type, the Q's and coupling coefficients of the various tuning units need not be the same, and may be, as is common, of different values to provide for an overall frequency response, to wit, one having a flat top and steep, substantially perpendicular sides or skirts.

To package a substantial number of such tunable units in a given small space in a receiver is a problem, the successful solution to which has thus far eluded the art. Moreover, different geometry and circuitry layouts in receivers require that the tuning stages be mountable in different manners in different receivers, both because of space requirements and to minimize the effect of crosstalk between physically adjacent circuits.

It is an object of the present invention to provide a frequency selecting assembly comprising a plurality of individual frequency selecting modules which can be packaged in a relatively small space.

It is a further object of the present invention to provide a frequency-selecting assembly on which a greater number of individual frequency-selecting modules may be mounted in a given space, thereby to improve the overall frequency selectivity of the assembly without significantly increasing its overall size.

It is another object of the present invention to provide a frequency selecting assembly comprising a plurality of interconnected frequency-selecting modules, which assembly may be mounted in either a vertical or horizontal orientation, to optimally satisfy existing space requirements in a communications receiver.

It is yet another object of the present invention to provide a frequency selecting modular assembly comprising a plurality of interconnected frequency selecting individual modules in which effective electrical and physical isolation is provided between these modules and the surrounding circuitry of the electrical equipment, e.g., a receiver, of which the assembly is a part.

To these ends, the present invention provides a frequency-selecting modular assembly having an input and an output terminal and a plurality of interconnected tunable modules operatively connected between the assembly input and output terminals and mounted on a support plate of insulating material. Each of the tunable modules is contained within a substantially identical housing and each has terminals extending therefrom in a substantially identical pattern. Selected ones of these unit terminals are respectively connected to a capacitance and an inductance contained in each of the housings which are associated with one another to form a resonant circuit.

Conducting means are provided on the support plate to operatively connect a selected terminal of one of said modules to the assembly input terminal and to a selected terminal of a second module, to connect selected module terminals on the second module to a selected terminal or terminals on the succeeding tunable module and so on, and to connect a terminal on the last module to the output assembly terminal. Each of the resonant circuits in the tunable modules are in this manner operatively connected to one another in cascade between the assembly input and output terminals, the modular assembly thus defining a multistage resonant tuning circuit. The support plate is preferably in the form of a printed circuit board and the interconnection of the various tunable modules is effected by conducting areas selectively formed on one surface of that board. The assembly input and output terminals extend from the board in a different direction from the tunable modules.

The tunable modules may also comprise a second or link inductance inductively coupled to the resonant circuit or tank inductance and operatively connected to one of the module terminals. Connection between succeeding modules is preferably made by operatively connecting the link-inductance terminal of one module to the tank inductance terminal of the next module.

The resonant circuits in each of the modules do not necessarily have the same characteristic, although they are preferably tuned to resonance at substantially the same frequency. The effective Q's of the tuning circuit and the coefficients of coupling between the stages may differ to shape the overall frequency characteristic of the assembly for optimal selectivity at the required bandwidth.

As herein specifically disclosed, the assembly of this invention may be mounted either horizontally or vertically, the vertical mounting being facilitated by the provision of mounting structure especially provided for that purpose. In one such embodiment an insulator element is mounted on the board and has mounting means spaced from and extending in a substantially parallel direction to the board. That mounting means may be in the form of conducting elements which may include the input and/or the output terminals of the assembly. Means are provided to electrically connect selective ones of those mounting means to selected conducting areas on the printed circuit board. The insulator element may be retained on the board by means of a conducting strip which may have extensions electrically connected to a common (e.g., ground) connecting area on the board.

In a second possible construction, particularly adapted for vertical mounting of the frequency selecting component of the invention, mounting means (which may include the input and/or the output terminals of the assembly) extend substantially horizontally from the board and a conducting plate is mounted on the board. That plate has a first part spaced from the board that extends substantially parallel to the mounting means to define therewith a tripodlike mounting structure for the component. Another part of that plate may be electrically connected to a selected conducting area on the board, such as ground, to electrically connect the component ground to the system ground through the conducting plate.

To achieve horizontal mounting of the frequency selecting assembly, the means for mounting the component to an external member may comprise pins (which may include the input and/or output terminals of the assembly projecting from the undersurface of the board. A cover may be placed over the tunable modules which are mounted on the upper surface of the board. That cover includes end parts that extend beyond the board in the same direction as the mounting pins but by a distance which is less than the length of those pins. In this manner the lower extremity of these end parts defines a stop which limits the lowermost position of the board, and thus provides clearance between the electrical contact points on the undersurface of the board and the external member when the board is mounted thereon by means of the mounting pins. The cover end parts preferably snap over and engage the board, thereby to reliably retain the cover to the board.

To the accomplishment of the above and to such other objects as may hereinafter appear, the present invention relates to a frequency-selecting modular component and an assembly made therefrom, as defined in the appended claims and as described in this specification taken together with the accompanying drawings in which:

Figure 6:
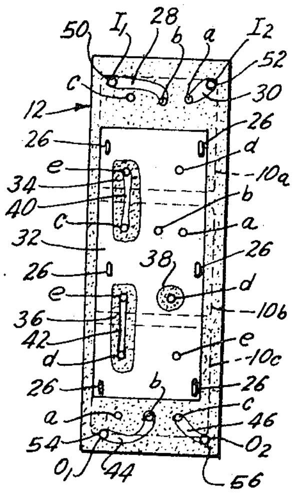
FIG. 6 is a bottom plan view of the modular assembly of FIGS. 4 and 5.
Figure 5:
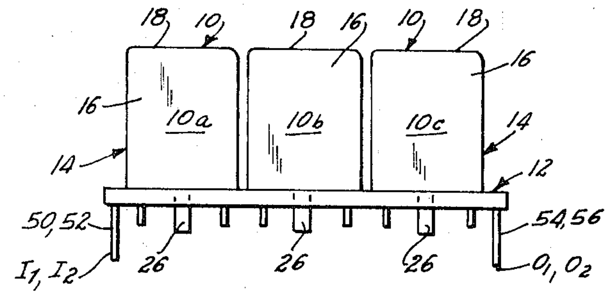
FIG. 5 is a side elevation of the modular assembly of FIG. 4.

The frequency-selecting modular assembly of the present invention is formed by mounting a plurality of tunable modules generally designated 10 on an insulating printed circuit board generally designated 12. The modules each comprise a substantially identical housing 14 and have an inductance and capacitance housed therein which are adapted to be operatively connected to one another and/or the components in the housing to define a resonant circuit. As shown in FIGS. 5 and 6, a pair of assembly input terminals I1 and I2 and a pair of assembly output terminals 01 and 02 extend downwardly from board 12. The tunable modules 10 are mounted on board 12 and extend from the board in a direction opposite to that of the assembly input and output terminals 0 and I. Means are provided to operatively interconnect the resonant circuit in the tunable modules 10 between the assembly input and output terminals to produce a frequency selecting assembly having a desired frequency characteristic.

Figures 1, 2, 3:
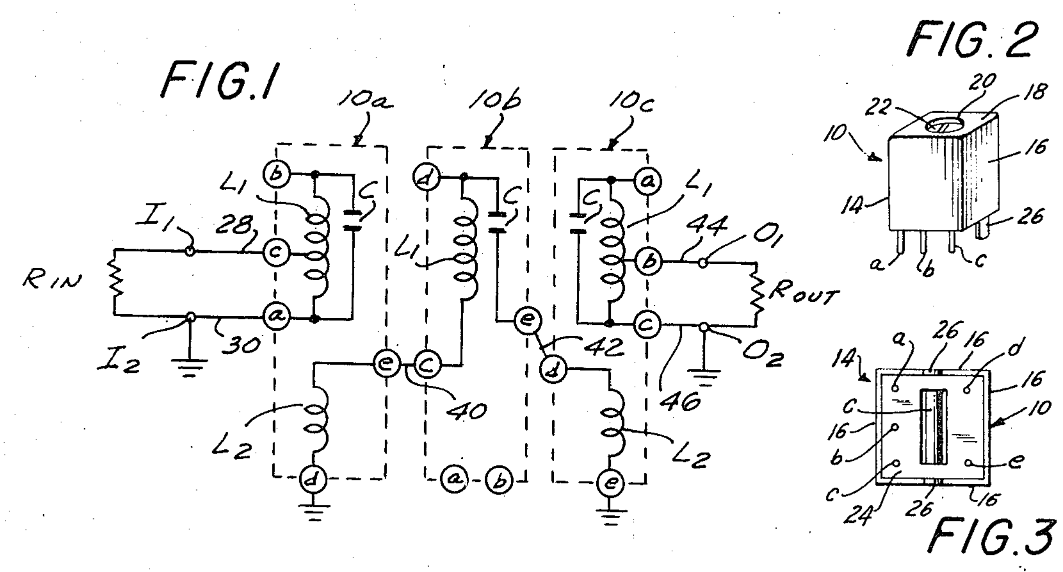
FIG. 1 is a schematic circuit diagram of a three-stage tuned circuit which may be implemented by the frequency-selecting modular component of the present invention.
FIG. 2 is a perspective view of a typical tunable unit which may be used in the assembly of the component of the invention.
FIG. 3 is a bottom plan view of the tunable unit shown in FIG. 2.

As shown in FIG. 2, module housing 14 comprises sidewalls 16 and a top wall 18 in which an opening 20 is formed. As shown schematically in FIG. 1, each module 10 contains within its housing 14 a tank inductor L1, and a capacitor C connected to at least one terminal of inductor L1. Inductor L1 and capacitor C (sometimes together with other inductances, such as those in other housings) define the aforesaid resonant circuit. The values of inductor L1 and capacitor C are chosen to resonate at a predetermined frequency. The value of inductor L1 may be varied to tune each module 10 by adjusting the relative vertical position of a tuning slug 22 accessible through opening 20. A link inductor L2 is usually contained in each housing 14, is closely inductively coupled to tank inductor L1 and preferably has a fewer number of turns than inductor L1. Each module 10 has an insulated base 24 (FIG. 3) accommodated within the open bottom of housing 14 and five module terminals *a*, *b*, *c*, *d*, and *e*, depend from base 24 and pass through that base into the interior of housing 14.

The relative positions of the module terminals *a–e* are substantially the same for each module 10. As shown in FIG. 3 they are in a first aligned group of three terminals *a*, *b*, *c* and a second aligned group of two terminals *d* and *e*, the two groups being laterally spaced from one another. Some or all of the module terminals *a–e* are operatively connected to one of the resonant circuit components (i.e., inductors L1 and L2 and capacitor C) in their associated tunable module 10.

The modules 10 are mounted on the upper surface of printed circuit board 12. Openings are provided through board 12 at appropriate locations to receive the module terminals *a–e*. If desired, tabs 26 may extend from the lower edges of two opposing sidewalls 16 of module housing 14, those tabs 26 passing through suitable openings formed in board 12. The under surface of board 12 has conducting areas formed thereon by any appropriate printed circuit fabrication technique, in a predetermined pattern as shown in FIG. 6 by the light (i.e., unshaded) portions of the board, the shaded portions indicating the insulating portion of the board. The assembly input and output terminals 0 and I, selected ones of the module terminals *a–e* (as well as tabs 26 when appropriate) may be electrically connected by means such as soldering, to selected portions of the conducting area on the board, thereby to connect the assembly input terminals I1 and I2 to selected terminals of the first module **10*a*, to connect another selected terminal of module 10*a* to a selected terminal of intermediate module 10*b*, to connect another selected terminal of module 10*b* to a selected terminal of the final module 10*c*, and finally to connect other selected terminals of module 10*c* to the assembly output terminals 01 and 02**.

Specifically, as seen in FIG. 6, conducting strip 28 connects assembly input terminal I1 to unit terminal *b* of module **10*a* and conducting strip 30 connects assembly input terminal I2 to module terminal a of unit 10*a*. A conducting area 32** defines a common ground connection for the modular component; terminal *d* of module **10*a* as well as tabs 26 of that module are soldered to area 32**, thereby to connect these parts to ground. Similarly, module terminals *a* and *b* of module **10*b*** and terminal *e* of module **10*c*, as well as the tabs 26 of these modules are all grounded by their connection to conducting area 32. Elongated insulating cutouts 34 and 36 and a circular cutout 38 are all formed in conducting area 32. A conducting strip 40 provided in cutout 34** connects terminal *e* of module **10*a*** to terminal *c* of intermediate module **10*b*. Similarly a conducting strip 42 is formed in cutout 36** and serves to connect terminal *e* of module **10*b*** to terminal *d* of module **10*c***. Terminal *d* of module **10*b* extends through cutout 38** and is thus not connected to any other module terminal.

A conducting strip 44 connects terminal *b* of module **10*c* to assembly output terminal 01, and a conducting strip 46 connects terminal $c$ of module 10$c$ to assembly output terminal 02**.

Figure 4:
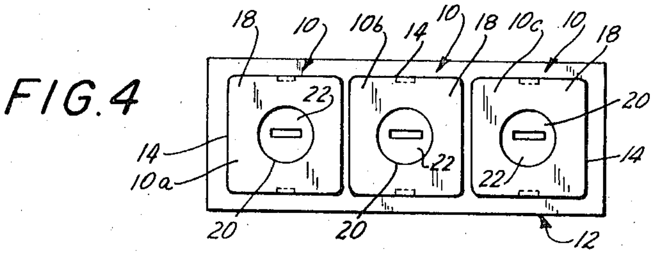
FIG. 4 is a top plan view of a typical three-unit frequency selecting modular assembly of the present invention.

The resulting circuit produced by the modular assembly of FIGS. 4–6 is shown in FIG. 1, in which Rin and $R_{out}$ respectively represent the external input and output impedances of that circuit. In module 10$a$, terminals $a$,$b$ and $c$ are respectively internally connected to the two ends and tap respectively of inductor L1 and thus that inductor is operatively connected via conducting strips 28 and 30 to input terminals I1 and L2.

One end of link inductor L2 in module 10$a$ is connected to that module's terminal $d$ and thus to ground, and its other end is internally connected to module 10$a$ terminal $e$. Capacitor C in module 10$a$ is internally connected to the ends of tank inductor L1 and defines a resonant circuit therewith. The signal developed at that resonant circuit is inductively coupled to link inductor L2 with an essentially unity mutual coupling coefficient therebetween.

The signal in inductor L2 is connected to terminal $c$ and thus to tank inductor L1 of module 10$b$ by conducting strip 40, so that the coefficient of coupling between the tuning or resonant circuits of modules 10$a$ and 10$b$ is substantially equal to the coupling coefficient between inductors L1 and L2 in module 10$a$.

Capacitor C in module 10$b$ is connected to inductor L1 at module terminal $d$ (which as noted above, has no external connection made thereto), and to module 10$b$ terminal $e$. The latter is connected by conducting strip 42 to terminal $d$ and hence to one end of link inductor L2 of the final module 10$c$, which in turn is inductively coupled to that module's tank inductor L1. The resonant circuit of module 10$b$ is thus operatively connected (through module 10$c$, link inductor L2, and strip 42) to the resonant circuit of module 10$c$.

The module 10$c$ capacitor C is internally connected to inductor L1 at module terminal $a$ which, as shown in FIG. 6, has no external connection made thereto, inductor L1 and capacitor C in module 10$c$ defining that module's resonant circuit. Capacitor C is also connected to module terminal $c$. The tap and end of tank inductor L1 of module 10$c$ are respectively internally connected to module 10$c$ terminals $b$ and $c$ which are in turn respectively connected by conducting strips 46 and 44 to assembly output terminals 02 and 01.

Thus a multistage tuning circuit, formed as a single assembly of modular components 10, is defined between input terminals I1 and I2 and output terminals 01 and 02. The frequency characteristic of that tuning circuit is determined by the resonant frequencies, the Q's and the coupling coefficients of each of the tuning circuits in modules 10$a$, 10$b$ and 10$c$. In a typical design, the center frequency of each tuning circuit is substantially identical, but there are different values of Q and different coupling coefficients between the circuits to achieve a steeper, and hence more selective frequency band-pass characteristic.

The frequency-selecting modular assembly of FIGS. 4–6 is mounted horizontally by securing and electrically connecting the elongated pins 50 and 52 (which respectively define input terminals I1 and I2), and similar elongated pins 54 and 56 (which respectively define output terminals 01 and 02) to suitable points on the external circuitry into which the tuning component is to be incorporated. Pins 52 and 56 may be externally connected to ground as indicated by the ground connection of input terminal I2 and output terminal 02 in FIG. 1.

Figures 7, 8:
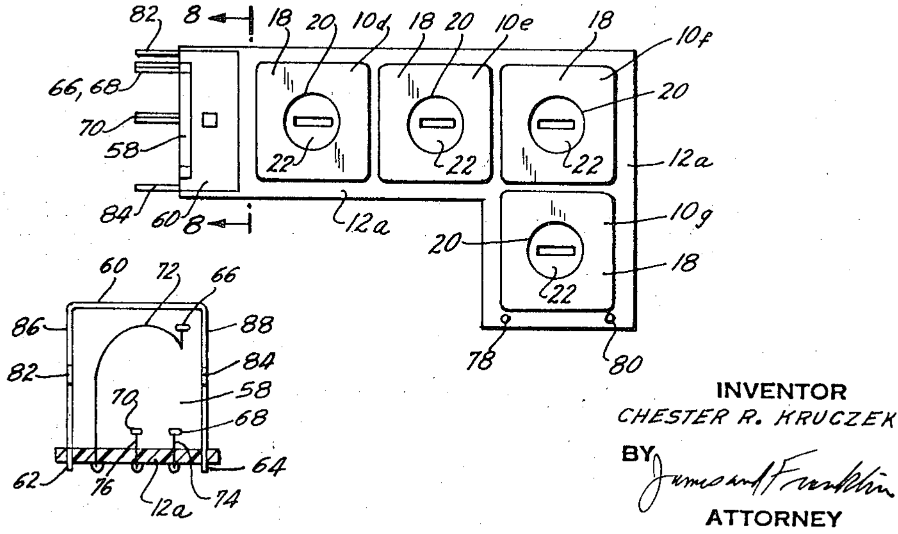
FIG. 7 is a top plan view of a second embodiment of a frequency selecting modular assembly of this invention.
FIG. 8 is an elevation, partly in section, taken along the line 8—8 of FIG. 7.

The embodiment of the frequency selecting assembly of FIGS. 7 and 8 is adapted for vertical mounting where that is desirable to satisfy the space requirements of the particular piece of equipment. That component comprises four tuning modules 10$d$, 10$e$, 10$f$ and 10$g$, mounted in a L-shaped arrangement on a correspondingly shaped printed circuit board 12$a$. Each of the modules contains module terminals and resonant circuits as described above with reference to modules 10$a$–10 and the unit terminals are interconnected by suitably formed conducting areas on board 12$a$, much as in the manner described above.

An insulator element 58 made of any suitable insulating material such as plastic, is mounted at one end of board 12$a$. Element 58 is secured to the board 12$a$ by a conducting strip 60 which is disposed about the periphery of insulator element 58. Strip 60 has downwardly extending tabs 62 and 64 (FIG. 8) which pass through openings formed in board 12$a$, and are soldered to the ground conducting area printed on the under surface of board 12$a$.

Three spaced contact fingers 66, 68 and 70 pass through openings formed in insulator element 58 and are spaced from and extend substantially parallel to the upper surface of board 12$a$. Conducting wires 72, 74 and 76 are respectively connected to contact fingers 66, 68 and 70, each pass through openings in board 12$a$, and are electrically connected to selected conducting areas on the undersurface of the board. One or more of these conducting areas may be connected to one or more of the first module 10$a$ on the board, and thus may define the input terminals for the frequency selecting assembly. (If element 58 were positioned near the final tunable unit, the contact fingers would serve as the output terminals of the component). In the embodiment shown in FIGS. 7 and 8, the output terminals are located at the other end of board 12$a$ at 78 and 80. Contact fingers 82 and 84 project outwardly from the sections 86 and 88 respectively of conductor strip 60 and to substantially the same tip positions as contact fingers 66, 68 and 70.

The mounting of the frequency-selecting modular component of FIGS. 7 and 8 is accomplished by inserting the contact fingers 66, 68, 70, 82 and 84 into appropriate points in the external receiver circuit, thereby making electrical connection thereto. Suitable connections are also made to assembly output terminals 78 and 80. In this manner the tuning circuit is electrically and mechanically incorporated into the receiver in a vertical orientation when that is required in the receiver.

Figure 9:
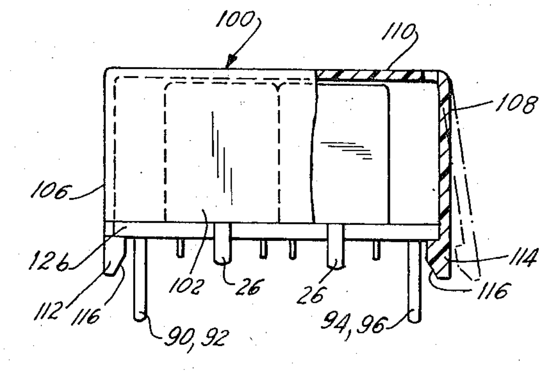
FIG. 9 is a side elevation, partly broken away, of another embodiment of the present invention.
Figure 10:
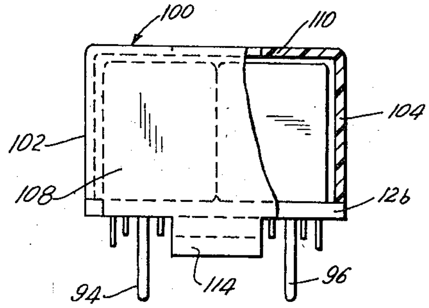
FIG. 10 is an end elevation, also partly broken away, of the embodiment of FIG. 9.
Figure 11:
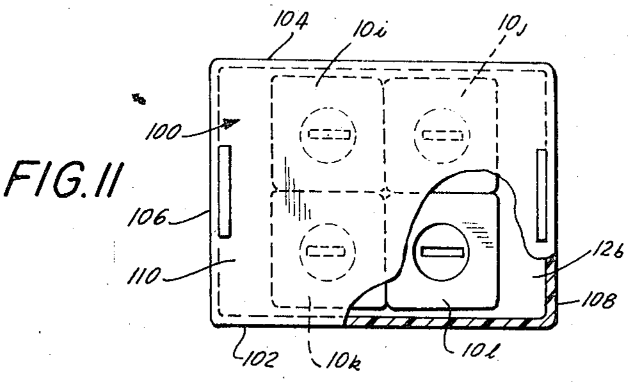
FIG. 11 is a top plan view, again partly broken away, of the embodiment of FIGS. 9 and 10.

The embodiment of the frequency selecting modular assembly illustrated in FIGS. 9–11 is particularly well suited for a horizontal mounting of the component with respect to the associated receiver circuitry. In that embodiment four tunable modules 10$i$–10$l$, are mounted on a board 12$b$ and have their tuning circuits interconnected by the conducting areas on that board to form a cascade connected tuning circuit between assembly input terminals 90 and 92, and assembly output terminals 94 and 96. These assembly input and output terminals 90–96 are each in the form of relatively elongated pins which extend from the under surface of board 12$b$, (i.e., the surface on which the conducting areas are formed and on which the electrical connections are made to the module terminals).

The assembly input and output terminals are adapted to be mounted on and electrically connected to the external circuitry (not shown). It is desired that this mounting and connection be made without causing an undesired connection between the external circuitry and the electrical connections on the under surface of board 12$b$. To this end a cover member generally designated 100 is placed over the assembly. Member 100 is made of suitable lightweight resilient insulating material, such as plastic, and has side walls 102 and 104, end walls 106 and 108, and a top wall 110. Each of the end walls 106 and 108 respectively comprises a downwardly extending end part 112 and 114 which, as shown best in FIG. 9, extends beyond the under surface of board 12$b$ in the direction of the mounting terminals 90–96 but by a distance which is less than the length of any of the mounting terminals. The distance by which parts 112 and 114 extend beyond the under surface of board 126 is, however, greater than the maximum distance that any of the module terminals or module tabs 26 extend therefrom.

When the frequency selecting component of FIGS. 9–11 is mounted and connected in the receiver, the tips of end parts 112 and 114 abut against the external circuit and thus limit the maximum downward travel of board 12$b$. The end parts 112 and 114 permit input and output terminals 90–96 to be mounted to the external circuitry while still ensuring that there will be sufficient clearance between the electrical connections of the tunable modules 10 on the under surface of board 12*b* and the external circuitry, as is desired.

End parts 112 and 114 preferably comprise inner camming surfaces 116. When the cover member 100 is mounted over the modules 10 these surfaces 116 pass over the opposite edges of the board 12*b*, to cause end parts 112 and 114 to move outwardly as shown by the broken line view of end part 114 in FIG. 9. After the camming surfaces 116 pass over the edges of the board, the end parts 112 and 114 spring back and snap-engage the edges of the board 12*b*, thereby to securely and reliably retain the cover member 100 on the board, with the end parts 112 and 114 at their proper location for providing clearance between the board and the external circuitry.

Figure 12:
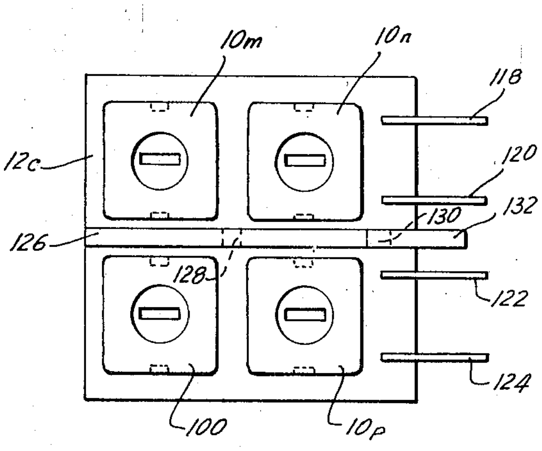
FIG. 12 is a top plan view of a further embodiment of the present invention.
Figure 13:
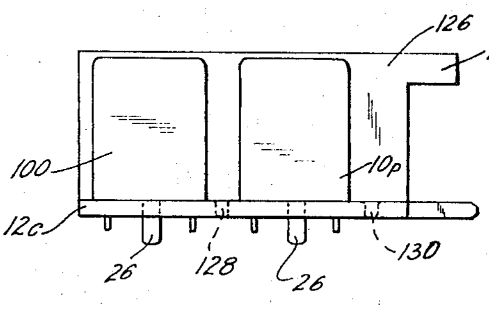
FIG. 13 is a side elevation of the embodiment of FIG. 12.

The frequency selecting modular assembly illustrated in FIGS. 12 and 13 is particularly well adapted for vertical mounting of the component in a receiver. In that component, the tunable modules 10*m*–10*p* are mounted on a printed circuit board 12*c* and have their internal resonant circuits interconnected in a manner similar to that described above to form a multistage tuning circuit. That tuning circuit is formed between input terminals which include contact fingers 118 and 120, and output terminals which include contact fingers 122 and 124. Contact fingers 118–124 all extend from one end of board 12*c*, are connected to appropriate conducting areas on the under surface of board 12*c*, and are arranged substantially parallel to each other.

A plate 126 of conducting material is mounted on board 12*c* by means of tabs 128 and 130 which project from the lower edge thereof, pass through openings formed through board 12*c* and are soldered at the under surface of the board t the common or ground conducting area formed thereon. A mounting finger 132 extends from the upper end of the right-hand edge of plate 126 (FIG. 13), is spaced from the upper surface of the board, and is substantially parallel to the contact fingers 118–124 and the board.

The mounting finger 132 and the contact fingers 118–124 form a triangular mounting structure for vertically mounting the component, the finger 132 defining the apex of the triangle. Contact fingers 118–124 are adapted to be physically and electrically connected to appropriate points on the external circuitry to incorporate the assembly into the receiver system. Mounting finger 132 is similarly mounted and is preferably electrically connected to the ground connection of the external circuit, thereby to electrically connect the ground plane of the frequency-selecting component to that of the external circuit.

The additional support provided by mounting finger 132 increases the stability of the vertical mounting of the frequency-selecting component in that it supports the component at a point spaced from that of the mounting input and output terminals.

Figure 14:
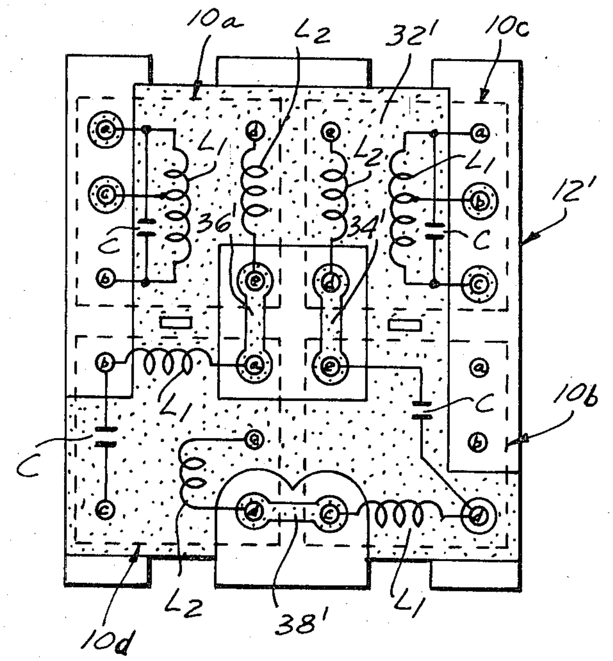
FIG. 14 is a bottom plan view of another embodiment of the present invention, the circuit elements and their connections being superimposed thereon schematically.
Figure 15:
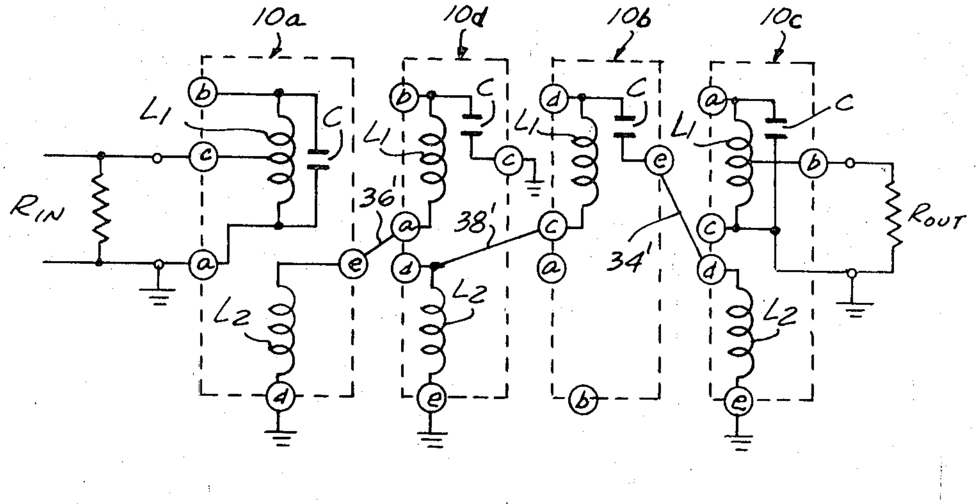
FIG. 15 is a schematic circuit diagram of the embodiment of FIG. 14.

The embodiment of FIGS. 14 and 15 is so designed as to take up a truly minimal amount of space. In addition, although it is adapted to be mounted on an external circuit unit, it does not require the use of special elongated panel board terminal elements such as the pins 50–56 of the embodiment of FIG. 5. Instead, certain of the module terminals themselves define the means by which the modular assembly is supported on and makes electrical connection with the external circuitry.

In the form specifically disclosed the module assembly of FIG. 14 (the circuit diagram of which is disclosed in FIG. 15) comprises four modules, 10*a*, 10*b*, 10*c* and 10*d*. The broken lines in FIG. 14 represent the outlines of the housings 14 of those four modules, and the broken lines in FIG. 15 represent schematically the confines of those modules, as was the case in FIG. 1. It will be noted that the circuit diagram of FIG. 15 is similar to that of FIG. 1 except that an additional module 10*d* is interposed between the first and second modules of the circuit disclosed in FIG. 1.

The printed circuit board 12′ of the embodiment of FIG. 14 is of closely the same size as the combined areas of the modules 10*a*–10*d*. It is provided with a large conducting area 32′ (which is adapted to be grounded) and with conducting strips 34′, 36′ and 38′. The depending terminals *a*–*e* of each of the modules extend through appropriate openings in the board 12′, as in the previously described embodiments but with this difference: In the previously described embodiments of the module, terminals *a*–*e* were of the same length and each served only to connect the module between the printed circuit board. In the embodiment of FIG. 14, the terminals *a* and *c* of module 10*a*, constituting the input terminals to the overall circuit, the terminals *b* and *c* of module 10*c*, constituting the output terminals of the circuit and terminal *c* of module 10*d*, constituting a grounding terminal, are longer, and possibly sturdier or more substantial, than the other terminals of the modules. Since these five terminals will therefore extend down beyond the other terminals, and since they are made sufficiently sturdy so as to be capable of supporting the weight of the entire modular assembly, they are used as the terminals and supports for the assembly, in the same manner as the terminals $I_1$, $I_2$, $O_1$ and $O_2$ were used in the embodiment of FIGS. 4–6. In the earlier described embodiment the output and input terminals I and O were separate and distinct from the module terminals and were spatially positioned beyond the confines of the modules. They therefore added somewhat to the complexity of the overall structure and caused a significant addition to the size of the printed circuit board 12 and hence to the overall space which the assembly occupied. By using module terminals as the assembly terminals a saving in cost, as well as a significant saving in space, is realized. The module assembly supporting terminals may be specially provided at appropriate locations in the appropriate modules, or, as is preferable, the same elongated terminals may be provided for all locations of all modules, with those terminals which are not to function as supports subsequently being cut to desired shorter length.

Since the circuit elements and their connections are superimposed on the structural plan view of FIG. 14, and since corresponding reference numerals are applied to corresponding parts in FIGS. 14 and 15, the relationship between the disclosed structure and the electrical circuit connections will be apparent from a comparison of those two figures.

The present invention enables the use of a plurality of standardized tunable modules on a single printed circuit board to form a frequency selecting assembly with a greater degree of flexibility and ease of design than has heretofore been possible. Practically any number of such modules may be mounted and interconnected to provide the desired receiver frequency band-pass and selectively characteristics.

The tunable modules may have different Q's and coupling coefficients to provide the overall desired frequency characteristic. However, the fact that these modules are each contained in a standardized housing having standardized external pin or terminal connections enables the circuit designer to readily combine a plurality of such modules having different electrical properties into a single compact package.

By adapting the construction of the frequency selecting modular assembly as shown herein in the various embodiments specifically described, the assembly may be incorporated into the external receiver circuitry in either a vertical or horizontal position as desired to best satisfy system packaging requirements. That mounting, however made, is reliable and stable, and permits the electrical interconnection between the assembly tuning circuitry and the external receiver circuitry in an optimum manner.

While several embodiments of the present invention have been herein disclosed, it will be understood that many variations may be made therein, all within the scope of the present invention.

I claim:

1. A frequency selecting modular filter assembly adapted for use as a single package comprising a plurality of substantially similar self-contained modular tunable units connected to one another to define a frequency selecting network, each of said units comprising a substantially identical housing, and inductance and a capacitance in said housing operatively connected to one another to define a resonant circuit, a plurality of unit terminals extending from said housing, at least one of said unit terminals being operatively connected to said resonant circuit, inductive means in at least some of said units inductively coupled to said resonant circuit, another of said terminals being operatively electrically connected to said inductive means, a support plate of insulating material, an input terminal and an output terminal on said support plate, said units being mounted on said support plate, and electrical connecting means on said support plate operatively connected to said unit terminals and effective to operatively inductively couple said resonant circuits in a frequency selecting network and to operatively electrically connect said network between said input and output terminals; said input and output terminals extending from said support plate in a different direction from said tunable units.

2. The assembly of claim 1, in which said support plate comprises a printed circuit board, said connecting means comprising conducting areas selectively formed on one surface thereof and including a common conducting area operatively connected to a reference point of each of said units, said board further comprising mounting means, said assembly further comprising a conducting strip operatively secured to and extending from said support plate and electrically connected to said common conducting area, said conducting strip comprising a part extending therefrom in the same direction as but spaced from said mounting means to define therewith a mounting structure for said assembly.

3. The assembly of claim 1, in which said support plate comprises a printed circuit board, said connecting means comprising conducting areas selectively formed on one surface thereof and including a common conducting area operatively connected to a reference point of each of said units, said board further comprising mounting means including one of said input and output terminals, said assembly further comprising a conducting strip operatively secured to and extending from said support plate and electrically connected to said common conducting area, said conducting strip comprising a part extending therefrom in the same direction as but spaced from said mounting means to define therewith a mounting structure for said assembly.

4. The assembly of claim 1, in which said support plate comprises a printed circuit board, said connecting means comprising conducting areas selectively formed on one surface thereof and including a common conducting area operatively connected to a reference point of each of said units, said board further comprising mounting means, said assembly further comprising a conducting strip interposed between at least two of said units operatively secured to and extending from said support plate and electrically connected to said common conducting area, said conducting strip comprising a part extending therefrom in the same direction as but spaced from said mounting means to define therewith a mounting structure for said assembly.

5. The assembly of claim 1, in which said support plate comprises a printed circuit board, said connecting means comprising conducting areas selectively formed on one surface thereof and including a common conducting area operatively connected to a reference point of each of said units, said board further comprising mounting means including one of said input and output terminals, said assembly further comprising a conducting strip interposed between at least two of said units operatively secured to and extending from said support plate and electrically connected to said common conducting area, said conducting strip comprising a part extending therefrom in the same direction as but spaced from said mounting means to define therewith a mounting structure for said assembly.

6. The assembly of claim 1, in which said unit terminals are positioned in substantially the same relative positions external to each of said units.

7. In the assembly of claim 1, mounting means including one of said input and output terminals operatively secured to and projecting from said support plate and adapted to be operatively connected to an external member, a cover member placed over said units and comprising end parts extending therefrom beyond said support plate in the same direction as said mounting means but by a distance less than the length thereof, thereby to provide clearance between said support plate and the external member when said component is mounted thereon by said mounting means.

8. In the assembly of claim 1, mounting means operatively secured to and projecting from said support plate and adapted to be operatively connected to an external member, a cover member placed over said units and comprising end parts extending therefrom beyond said support plate in the same direction as said mounting means but by a distance less than the length thereof, thereby to provide clearance between said support plate and the external member when said assembly is mounted thereon by said mounting means.

9. The assembly of claim 8, in which said end parts extend from the side walls of said cover member and include means effective to snap-engage said support plate, thereby to retain said cover member and said support plate.

10. The assembly of claim 1, in which selected unit terminals of two different units extending beyond said support plate in a different direction from said tunable units constitute said input and output terminals of said assembly.

11. The assembly of claim 10, in which said support plate comprises a printed circuit board, said connecting means comprising conducting areas selectively formed on one surface of said board and electrically interconnecting unit terminals other than those which constitute said assembly input and output terminals.

12. The assembly of claim 1, in which said support plate comprises a printed circuit board, said connecting means comprising conducting areas selectively formed on one surface thereof.

13. The assembly of claim 12, in which said unit terminals are positioned in substantially the same relative positions external to each of said units.

14. The assembly of claim 12, further comprising an insulator element, means operatively securing said insulator element to said board, and mounting means extending from said insulator element in a direction substantially parallel to and spaced from said board.

15. In the assembly of claim 14, means for electrically connecting said mounting means to a selected conducting area on said board.

16. In the assembly of claim 14, said mounting means including one of said input and output terminals, and comprising means for electrically connecting said mounting means to a selected conducting area on said board.

17. In the assembly of claim 14, a conducting strip disposed about said insulator element and having second mounting means extending therefrom substantially parallel to said first mentioned mounting means, and means for securing said strip to said board.

18. The assembly of claim 17, in which said strip securing means comprises means for electrically connecting said strip to a selected conducting area on said board.

19. In the assembly of claim 16, a conducting strip disposed about said insulator element and having second mounting means extending therefrom substantially parallel to said first-mentioned mounting means, and means for securing said strip to said board.

20. The assembly of claim 19, in which said strip securing means comprises means for electrically connecting said strip to a selected conducting area on said board.

* * * * *